(12) United States Patent
Van Dusen (10) Patent No.: US 11,741,164 B2
(45) Date of Patent: Aug. 29, 2023

(54) SYSTEM AND METHOD FOR MODELING, FUZZY CONCEPT MAPPING, CROWD SOURCED SUPERVISION, ENSEMBLING, AND TECHNOLOGY PREDICTION

(71) Applicant: Dennis Alan Van Dusen, Ellicott City, MD (US)

(72) Inventor: Dennis Alan Van Dusen, Ellicott City, MD (US)

( * ) Notice: Subject to any disclaimer, the term of this patent is extended or adjusted under 35 U.S.C. 154(b) by 70 days.

(21) Appl. No.: 17/337,450

(22) Filed: Jun. 3, 2021

(65) Prior Publication Data

US 2021/0397656 A1  Dec. 23, 2021

Related U.S. Application Data

(63) Continuation of application No. 14/014,229, filed on Aug. 29, 2013, now Pat. No. 9,461,876.

(Continued)

(51) Int. Cl.

| | |
|---|---|
| *G06F 16/903* | (2019.01) |
| *G06F 16/904* | (2019.01) |
| *H04L 41/04* | (2022.01) |
| *G06N 20/00* | (2019.01) |
| *G06Q 10/10* | (2023.01) |
| *G06F 30/20* | (2020.01) |
| *G06Q 10/101* | (2023.01) |
| *G06N 5/02* | (2023.01) |

(Continued)

(52) U.S. Cl.
CPC ...... *G06F 16/90335* (2019.01); *G06F 16/904* (2019.01); *G06F 30/20* (2020.01); *G06N 5/02* (2013.01); *G06N 5/04* (2013.01); *G06N 20/00* (2019.01); *G06Q 10/10* (2013.01); *G06Q 10/101* (2013.01); *G06Q 30/0201* (2013.01); *G06Q 30/0241* (2013.01); *G06Q 30/0279* (2013.01); *G06Q 50/01* (2013.01); *G06Q 50/184* (2013.01); *G07C 13/00* (2013.01); *H04L 41/04* (2013.01); *G06F 2111/10* (2020.01); *G06Q 40/06* (2013.01); *G06Q 50/18* (2013.01); *G06Q 50/20* (2013.01); *G06Q 2220/12* (2013.01); *G06Q 2230/00* (2013.01)

(58) Field of Classification Search
None
See application file for complete search history.

(56) References Cited

U.S. PATENT DOCUMENTS

| | | | |
|---|---|---|---|
| 7,480,640 B1 * | 1/2009 | Elad | G06Q 10/10 |
| | | | 706/14 |
| 2009/0012842 A1 * | 1/2009 | Srinivasan | G06F 16/3344 |
| | | | 707/999.005 |

(Continued)

*Primary Examiner* — Kenny S Lin (57) ABSTRACT

The invention provides a system and method for providing ttx-based categorization services and a categorized commonplace of shared information. Currency of the contents is improved by a process called conjuring/concretizing wherein users' thoughts are rapidly infused into the Map. As a new idea is sought, a goal is created for a search. After the goal idea is found, a ttx is concretized and categorized. The needs met by such a Map are prior art searching, competitive environmental scanning, competitive analysis study repository management and reuse, innovation gap analysis indication, novelty checking, technology value prediction, investment area indication and planning, and product technology comparison and feature planning.

1 Claim, 5 Drawing Sheets

Related U.S. Application Data

(60) Provisional application No. 61/694,259, filed on Aug. 29, 2012.

(51) Int. Cl.
    *G06N 5/04*          (2023.01)
    *G06Q 30/0201*    (2023.01)
    *G06Q 30/0241*    (2023.01)
    *G06Q 30/0279*    (2023.01)
    *G06Q 50/00*      (2012.01)
    *G06Q 50/18*      (2012.01)
    *G07C 13/00*      (2006.01)
    *G06F 111/10*     (2020.01)
    *G06Q 40/06*      (2012.01)
    *G06Q 50/20*      (2012.01)

(56) References Cited

U.S. PATENT DOCUMENTS

| | | | |
|---|---|---|---|
| 2010/0070448 A1* | 3/2010 | Omoigui | H01L 27/1463 706/55 |
| 2010/0211603 A1* | 8/2010 | Bealing | G06F 16/22 707/776 |
| 2012/0330869 A1* | 12/2012 | Durham | G06N 5/022 706/16 |
| 2017/0235848 A1* | 8/2017 | Van Dusen | G06F 16/904 705/12 |

* cited by examiner

SYSTEM AND METHOD FOR MODELING, FUZZY CONCEPT MAPPING, CROWD SOURCED SUPERVISION, ENSEMBLING, AND TECHNOLOGY PREDICTION

This application references and is derived from provisional patent application No. 61/694,259 with EFS ID of 13611226, and this application claims priority from that provisional application. This application is a continuation from non-provisional patent application Ser. No. 14/014,229, wholly included herein by reference.

FIELD OF INVENTION

The invention relates generally to the field of information technology. More specifically, but not by way of limitation, the invention relates to a system and method for concept-based management of categorizations or classifications to organize a commonplace, enhancing the navigability of very large information bases by providing in-depth sub-categorization of terminology bases, providing users with incentives to be creative, protecting crowd sourced contributions, managing searches for what is known either within, or in some accessible location outside of it, and establishing communities associated especially with the concepts, or its narrow categories, and particularly in Intellectual Property. It provides a user a searching tool for something known or unknown, capturing the concept if unknown to be reused as if known. This invention extends to new forms of fuzzy clustering and hierarchical self-organizing maps.

BACKGROUND

Today, in fields ranging from the general use of conceptual diagraming to specific purposes such as prior art searching, competitive environmental scanning, competitive analysis study repository management and reuse, innovation gap analysis identification, novelty checking, technology prediction, investment identification and planning, and product technology comparison and feature planning, users are ever more in need of finding very specific and highly relevant information from a mass of data that is not organized.

Known systems for ideation and innovation, developed over centuries, are closed so that the ideas generated are hidden for long periods. While this is somewhat effective in a commercial sense, the attitude fostered and results are often counter-productive for society. Modern concepts of open software and crowd sourcing, coming from the utopian view, also have faults.

SUMMARY OF THE INVENTION

The invention provides, in one embodiment, a system and method for providing crowd sourced consensus building, topic categorization services, a commonplace, and on-line community services by topics.

A result of the system and method is a Common Mental Map (CMM) for navigation. A visualization of a map provides a customized view of this 'best available' information, with objective and subjective views as information from users and disparate external sources is merged.

A user searching for something, known or unknown, provides one source of information for the commonplace. By capturing the concept searched for, the system saves the creative thought for reuse, and captures the fact of the search for that concept for value prediction.

The commonplace provides for analysis and prediction on a 'best available' data basis.

The term concept is too general to be used in the following. Generally, concepts are ttxs represented by cnxpts. The Topic Map Standard 'subject' is similar to the ttx, and the 'topic' is similar to the cnxpt, but more general.

The following outlines a search and categorization tool useful, in one embodiment, for rapidly finding tcepts, TPLs, or appcepts stored in a CMMDB that contains a structured list of categories including, but not limited to: fields of study, categories of tcepts, and categories of appcepts.

In one embodiment, the categorization is visualized, in one CMMV visualization technique called a map, as a visible 'skin' of a sphere that represents, including, but not limited to, a: cnxpt, goal, tcept, tcept category, TPL, tplxpt, appcept, appcept category. The CMMV 'category' spheres may contain internal spheres that represent, including, but not limited to, a: tcept, tcept category, appcept, appcept category, or another ttx. The CMMV 'category' structure is derived from various relationships in the CMMDB. The CMMDB is initially populated by automated consolidation of existing indices and tools such as cluster and cross-citation analysis, but is maintained and extended by crowd source collaboration, the ease of which is improved by effective visualization and editing interfaces. 'Votes' on the existence, validity, relationships, categorization, relevance of external information, and data quality of info-items within the CMMDB are the basis for reaching consensus on the accuracy of the categorization, prediction, naming, and description.

This system is intended to contain the basis of categorization for, including, but not limited to, ttxs and tcepts. The tcepts are not only historic, but prospective.

Purposes

An embodiment of the invention provides management of a CMMDB in a specific domain of the owner's choice.

An embodiment of the invention provides a visualization tool for depicting a map of the ttxs in a CMMDB, allowing map navigation, searching, refinement operations, execution of analytics, and interaction with associated communities.

An embodiment of the invention provides the mechanisms and procedures to achieve a CMMDB that is the best available source for a list of ttxs.

An embodiment of the invention provides the mechanisms and procedures to achieve a CMMDB database that is the best available source for a list of txpts and appcepts.

An embodiment of the invention provides the mechanisms and procedures to utilize a combination of user discussions, categorizations from outside, collected concretizations of conjurings, and the prior state of the stored Common Mental Map to provide a base upon which to users can search for abstract thoughts that are converted to new categorized ttxs to provide a continually improved and explicit formal specification of the ttxs that are assumed to exist in some Area of Interest and the relationships that hold among them.

An embodiment of the invention provides a method and apparatus for providing ttx categorization visualizations ("maps").

An embodiment of the invention provides a method and apparatus for managing the lifecycle of a ttx, comprising: receiving data indicating a ttx; categorizing the data indicating the ttx to associate the data with one of a predetermined plurality of categories or a new category; setting access controls for the ttx data, disseminating the ttx data to user computing systems for view and use; accepting extensions, improvements, and refinements of the ttx characteristics; accumulating user interest information; selling or licensing the ttx data.

An embodiment of the invention provides management of a crowd sourcing paradigm for ideation providing teasing out of new innovations into a global common ground to share information; confidentiality in handling of the new ideas; confidential comparison to similar ideas; empowering patent protection; establishing collaborative development; predicting fruition and value; and securitizing innovations, all while language issues are reduced or eliminated by utilizing language independent storage and visualization with a multi-dimensional structure of symbols and diagrams and filters providing for display of language specific information when available.

An embodiment of the invention provides the mechanisms and procedures to create and expand a CMIMIDB to a number of users in a 'crowd sourcing' construct to conceptualize, or to add, concretize, and refine information about: including but not limited to: tpxs, ttxs, tcepts, and appcepts.

An embodiment of the invention provides a method for providing ttx categorization by consensus clustering within a fxxt, comprising: receiving data indicating a ttx within a fxxt, the data including at least one of a defining of a search goal, a defining of a query, a marking of a place on a visualization derived from the CMIVIDB, an extension of a ttx, a subdividing of a ttx, a combining of two ttxs to form a convergence, a defining of a new ttx, a stating that a ttx is different from another ttx, a defining of a contradictory feature or requirement for an existing ttx, a coalescing of a ttx into the CMIDB, a stating that a ttx is defined by an information resource, a stating that an information resource is relevant to the definition of a ttx, a showing of interest in a ttx; calculating pairwise ttx identity indicator similarity values within a fxxt, the identity indicator similarities including at least one of: a semantic distance between ttx textual definitions, a semantic distance between ttx descriptions, a semantic distance between ttx names, commonality of occurrence relationships between each ttx and a information resource or relevant entity, commonality of association references between each ttx and a third ttx, a consensus vote toward similarity of the ttx pair, a prior ranking of semantic similarity recognized as generally accurate, or some combination of these; iteratively forming cluster ttxs to indicate a grouping of similar ttxs by a pairwise clustering algorithm utilizing the identity indicator similarity values; and merging, bottom up, the cluster ttxs with pre-existing category ttxs that share the exact same set of member ttxs; converting the remaining cluster ttxs to category ttxs.

An embodiment of the invention provides a method for monetizing ttx categorizations, including: registering at least one ttx category; offering registered ttx categorizations for sale; licensing for use the ttx categorizations and information associated the ttx categorization, granting access and enabling the ttx categorizations to be used by a customer on their local system; selling licenses to access communities associated with registered ttxs, accepting private data to be associated with ttxs, selling private data associated with ttxs, accepting registrations of consortiums formed for collaborative development of ttxs, accepting and processing collaboration and investment transactions involving consortiums, accepting and processing investment transactions involving innovation investment pools.

An embodiment of the invention provides a method for at least one of creation of, naming, specifying a scopx for, listing, voting on, rejecting, linking information to, or describing relationships between the at least two info-items of a field of science; tcept category; tcept; appcept; inventor; patent; product; or roadblock stopping satisfaction of an appcept by a tcept.

An embodiment of the invention provides a method for improving a ttx, including: providing incentives for improving a ttx definition, description, or characteristics; providing a ttx definition system; providing a ttx description system; providing a ttx characteristic change system; and providing community access to the ttx definition system, the ttx description system and the ttx characteristic change system.

An embodiment of the invention provides a method for improving the CMMSYS, including: providing incentives for improving a tpx definition, description, or characteristics; providing an information package requirement description system for stating CMMSYS specifications; providing a tpx definition system; providing a tpx description system; providing a tpx characteristic change system; and providing administrative and developer community access to the information package requirement description system and CMMSYS specifications; tpx definition system, the tpx description system and the tpx characteristic change system.

An embodiment of the invention provides user procedures and a toolset for obtaining one of entertainment, education, personal gratification, esteem for participation in the communities based upon the CMMDB.

An embodiment of the invention provides a method and a toolset for calculating and mining ttx value data from the CMMDB.

An embodiment of the invention provides a method for sharing ttx-based information, including but not limited to: providing related descriptions, analysis articles, identifying at least one of a value, strategy, purpose, application, feature, requirement, roadblock, related to the ttx; sharing visualization experiences including but not limited to: tours taken, visualization viewpoints.

An embodiment of the invention provides a method for customer purchase of at least one of a DataSet, an access right, a registration right, a methodology, an analytic, a model, an execution of a methodology, an execution of an analytic, an execution of a model, a license, a subscription, a CMMSYS component; including: viewing a list of at least one of DataSet packages for a selected ttx element or category, other DataSet package, an access right, a registration right, a methodology, an analytic, a model, an execution, a license, a subscription, a CMMSYS component; and accepting a selecting for purchase at least one DataSet package from the list of DataSet packages.

An embodiment of the invention provides a system configured to manage a customer purchase process, including: an e-commerce catalog module configured to present to a buyer a list of at least one of: DataSet package, an access right, a registration right, a methodology, an analytic, a model, an execution of a methodology, an execution of an analytic, an execution of a model, a license, a subscription, a CMMSYS component, the e-commerce catalog module further configured to receive from a buyer a selection of the at least one of a DataSet package, an access right, a registration right, a methodology, an analytic, a model, an execution of a methodology, an execution of an analytic, an execution of a model, a license, a subscription, a CMMSYS component from the list; a license and access control module coupled to the e-commerce catalog module, the license and access control module configured to limit access to the system to authorized users; a distribution module coupled to the e-commerce catalog module, the distribution module configured to connect with a user system and to provision the user system as needed to install, configure, and grant access to the selected at least one of a DataSet package, an access right, a registration right, a methodology, an analytic, a model, an execution of a methodology, an execution of an analytic, an execution of a model, a license, a subscription, a CMMSYS component.

An embodiment of the invention provides a system configured to share ttx-based analysis, including: a library configured to contain descriptions of tools and application elements, including but not limited to: methodologies, analytics, and models; and a CMMSYS information package catalog linked to the library, the CMMSYS information package catalog containing categorizations for the available elements described in the ttx library and e-commerce functions to enable users to obtain access to the elements for use.

An embodiment of the invention provides a method for alerting in a categorization system, including: notification regarding a change of, including but not limited to: a tpx or its characteristics; a ttx or its characteristics, a specified result from an analytic, the presence of a new developer, provider, or investor.

An embodiment of the invention provides a system configured to provide categorization services to a customer, including: a distribution engine; CMMSYS local system components, and an interface to a customer system, the interface coupled to the distribution engine, the distribution engine configured to distribute, including but not limited to, CMMSYS framework components and CMMDB data sets, the CMMSYS local system components configured to operate on one of a mid-tier server or a workstation, the interface configured to collect data from the customer system, the mid-tier server configured to serve CMMDB data, to manage access, to store and aggregate the collected data, and to release collected data to the central CMMDB, and workstation configured to store and aggregate the collected data, and to release collected data to the mid-tier and central CMMDBs.

An embodiment of the invention provides a method for protecting against full or uncontrolled disclosure of the information held regarding a tpx or ttx, such that only authorized users may obtain controlled information related to the ttx, and the access may be cut off where a license is exceeded or authorization has been terminated.

An embodiment of the invention provides management of a set of communities that each are connected to a ttx of a CMMDB in a specific domain of the owner's choice.

An embodiment of the invention provides methods for initiating and adding community information connected with a ttx, including: facilities for narrow topic chats, blogs, advertisements by nature of transaction desired, discussion forums, meeting, conversation, online-discussion, conference, or other event information, tokens for use to gain access to meetings or other events or to obtain discounts, articles, search scripts, search retrieval results, navigation tours, bookmarks or links to other information, information, information available for purchase or subscription, surveys, contact lists, personal profiles, inventor/conjurer information, development consortium information, and access rights and management information for each of the community facilities.

An embodiment of the invention provides a method to at least one of become developer, become publisher, become customer, become member, advertise, offer, search for, sell, select, purchase, register, distribute, offer for download, request, opt-in for, offer access to, sell access to, grant access to, join, or publish the at least one of the new, enhanced, improved, corrected, or revised at least one of portal function, body of information, subscription, DataSet, or access right.

An embodiment of the invention provides a method to incentivize use by users by at least one of offering awards, membership in a community, access rights, right to own, right to advertise, information, on-line personality/presence, discounts, prizes, recognition as at least one of expert, being creative, added knowledge, provided editing, made significant leap in invention; inclusion by at least one of a developer; a contributor; a publisher; a member of a development consortium; a member of a special group of achievers.

An embodiment of the invention provides a system configured to distribute ttx categorizations in a network, the system including a framework, the framework configured to distribute CMMDB information packages and included tpx and ttx information with restricted use IDs, to configure and control access, and to collect tpx and ttx data, imports, and categorization data from the network.

An embodiment of the invention provides a method for registering a CMMSYS information package, including: registering as a user on a portal to the system; provisioning the CMMSYS information package; establishing access; connecting to a CMMDB; and accessing and collaboratively improving the CMMDB, portal tools enabling the user to access tpx and ttx information and to submit tpxs, ttxs, and descriptive information to the CMMDB, and tools enabling administrators and developers to improve the CMMSYS.

An embodiment of the invention provides a method for managing a CMMSYS information package lifecycle, including: stating a requirement for the package, developing the package, certifying the package, distributing the package during provisioning, licensing the use of the package, registering the package, configuring the package, authorizing the package for use, granting access to the package, providing access to the package, terminating access to the package, terminating the license for the package, terminating the registration for the package, reconfiguring the package, re-provisioning the package by update.

An embodiment of the invention provides a method for managing a consortium for collaborative ttx development, preparing and submitting patent applications, forming a business, accepting or offering investment, including but not limited to: providing a consortium member exchange; coordinating member to candidate communications for negotiations for joining the consortium, registering members into the collaborative, managing secure storage of consortium documentation and tracking contributions, coordinating member to investor communications for negotiations for funding the consortium, registering members into the collaborative, collecting and distributing investment funds, and providing a contribution submission tool.

An embodiment of the invention provides a method for managing a collaborative development process, including: providing a developer exchange Website; registering a developer on the exchange Website; and providing information package submission tools via the exchange Website.

An embodiment of the invention provides a system and method for managing the rapid application for patents suitable in a first to file patent system, consisting of: ideation; methodology based completion of the minimum necessary for patent application; online collaboration mechanism for assisted preparation of an application; preparation for electronic patent application; assistance for electronically filing the application; electronic application and payment mechanism and process; online auction mechanism and process for licensing and assignment of patent rights; online investment mechanism and process for funding invention and for funding development; online option investment mechanism and process for funding invention and for securing future patent rights; and online intellectual property portfolio management.

An embodiment of the invention provides a system and method for displaying for a user a categorization, graph, directed graph, precedence diagram, or graphical forest arranged in an esthetically acceptable manner for the user according to: their subjective opinion, their subjective opinion considering the opinions of others, the objective opinion as formed by a crowd, the consensus opinion of an ensemble of machine learning results, or the subjective opinion of the user considering the opinions of others as well as an ensemble of machine learning results.

The features and advantages of the invention will become apparent from the following drawings and detailed description.

BRIEF DESCRIPTION OF THE DRAWINGS

Embodiments of the invention are described with reference to the following drawings, wherein.

DETAILED DESCRIPTION

Figure 1:
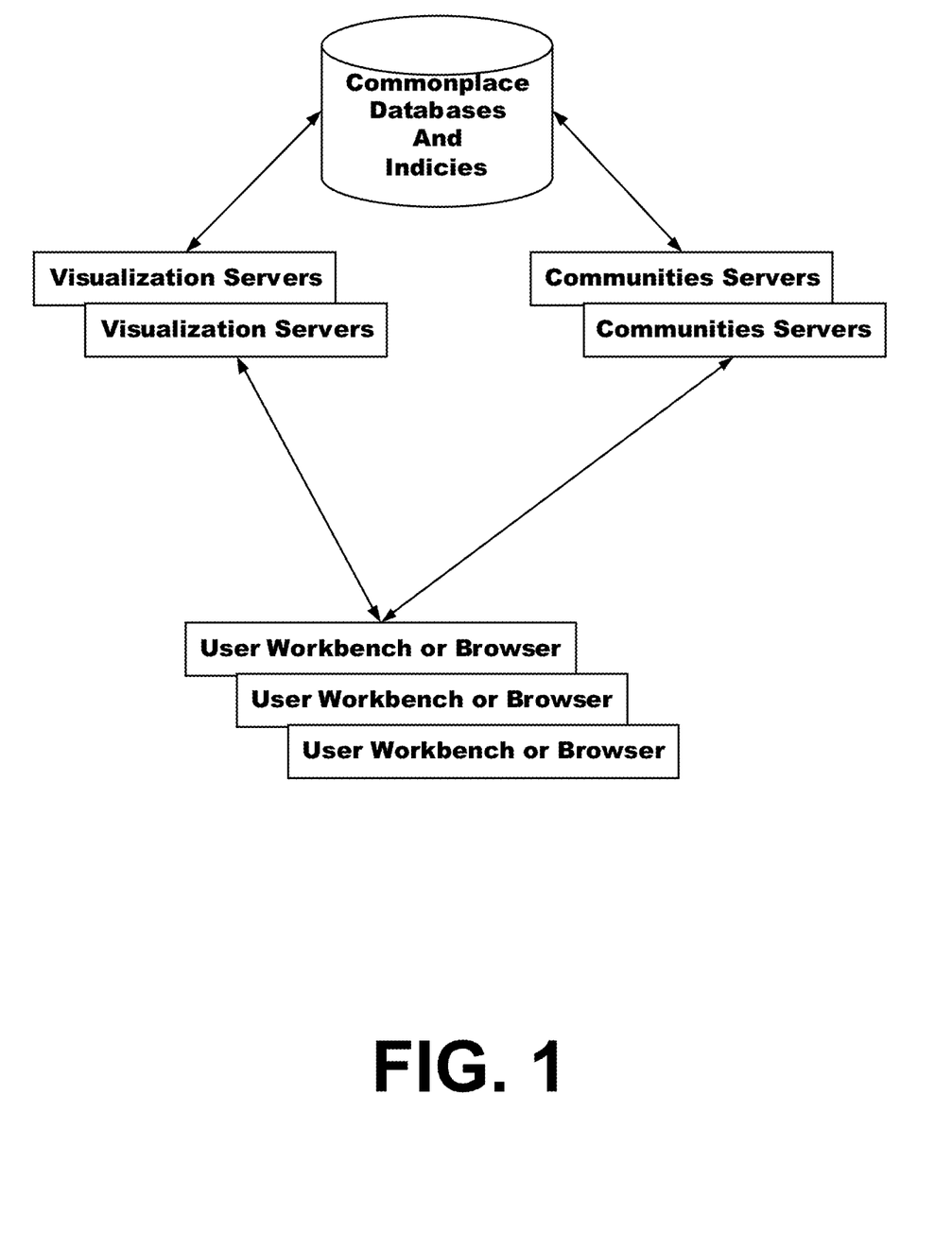
FIG. 1 is a block diagram of a system architecture, according to an embodiment of the invention.
Figure 2:
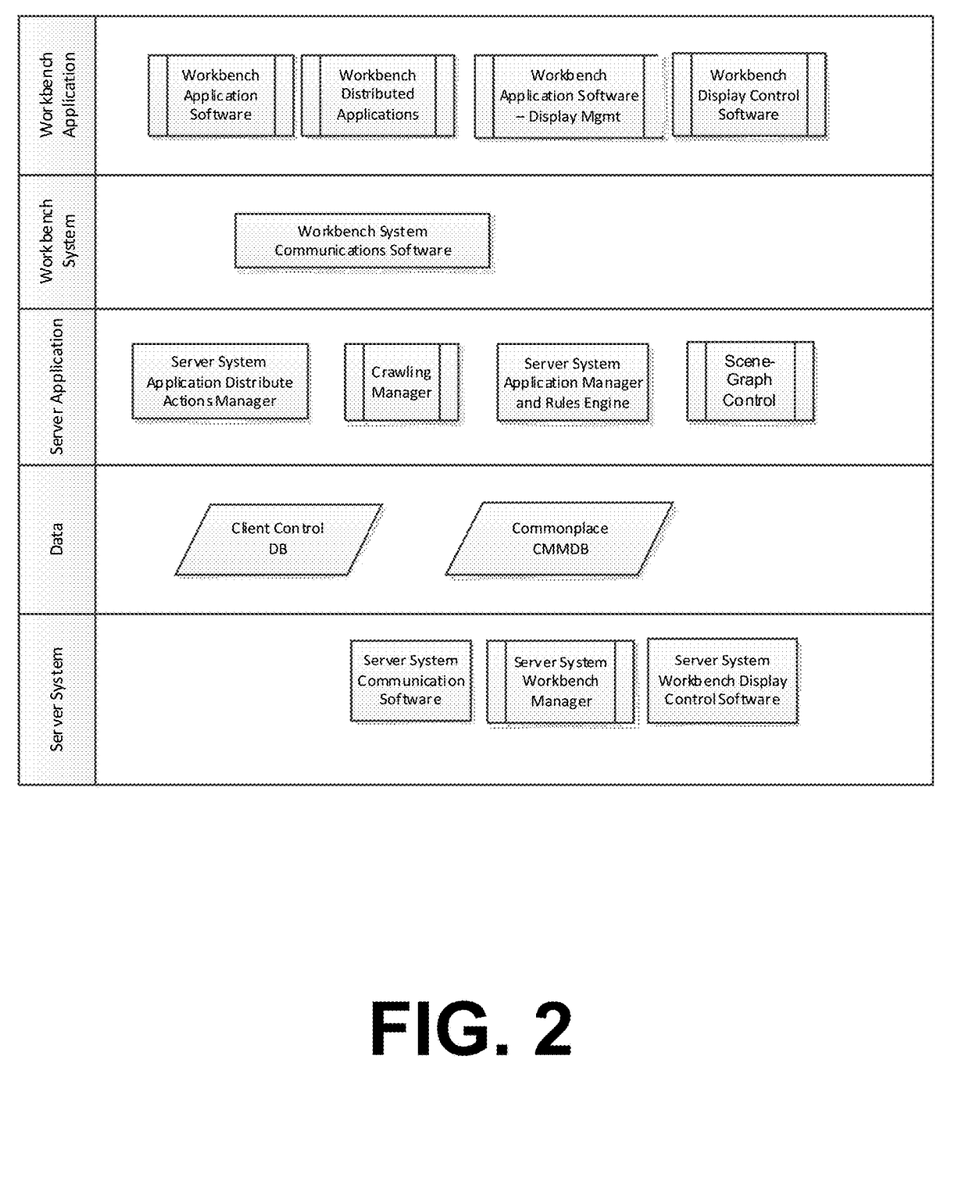
FIG. 2 is a block diagram of a functional architecture, according to an embodiment of the invention.
Figure 3:
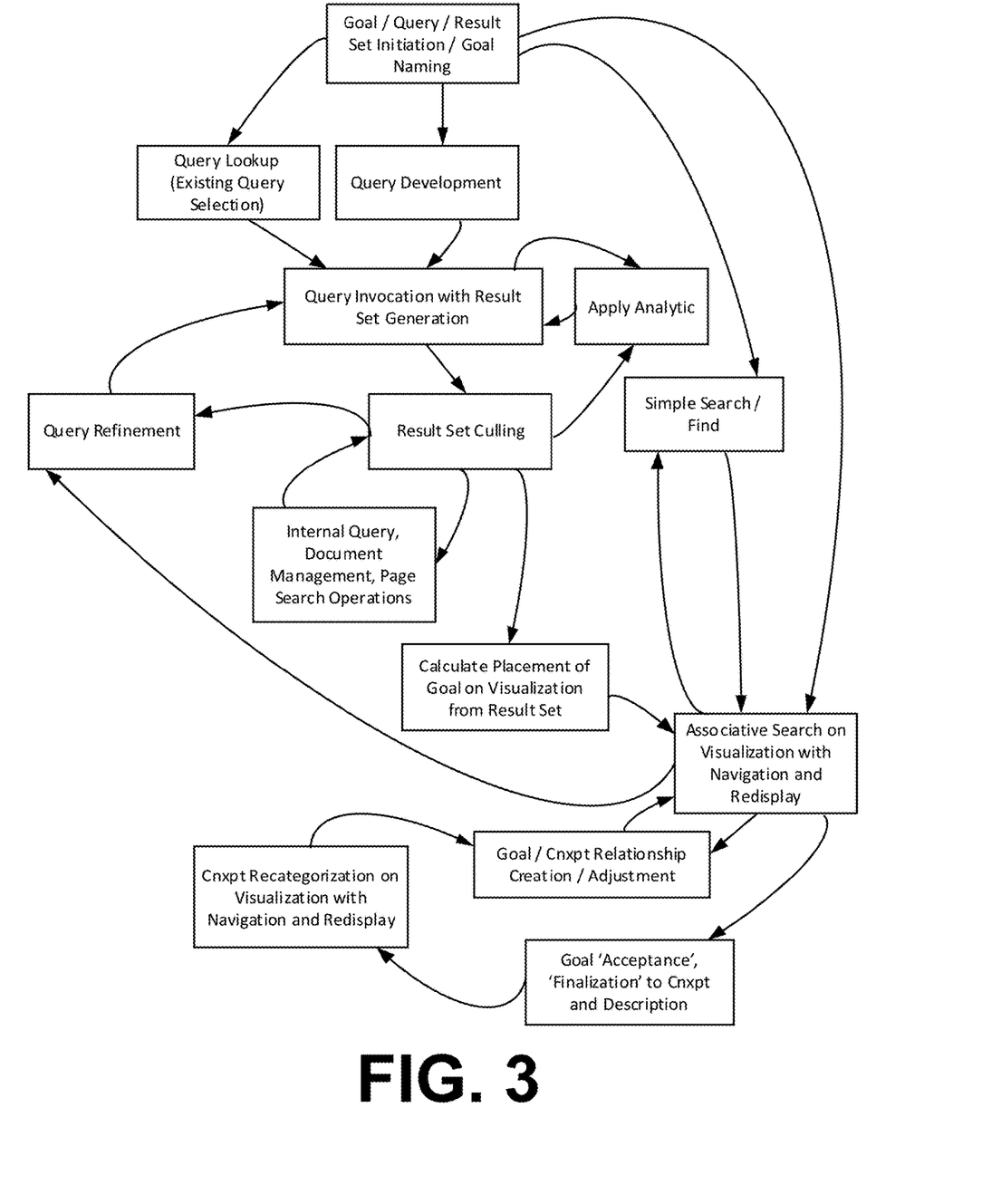
FIG. 3 is a block diagram of the query and conjure process, according to an embodiment of the invention.
Figure 4:
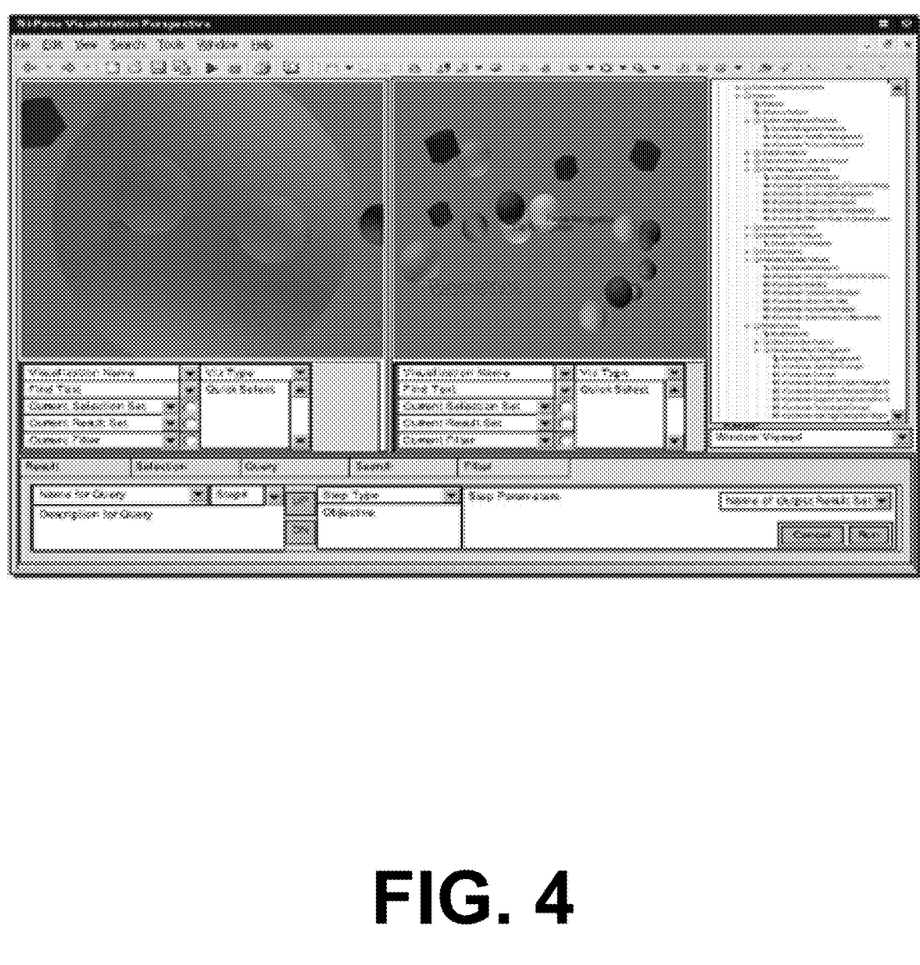
FIG. 4 is a workbench user interface view showing the visualizations and maps for navigation, according to an embodiment of the invention.
Figure 5:
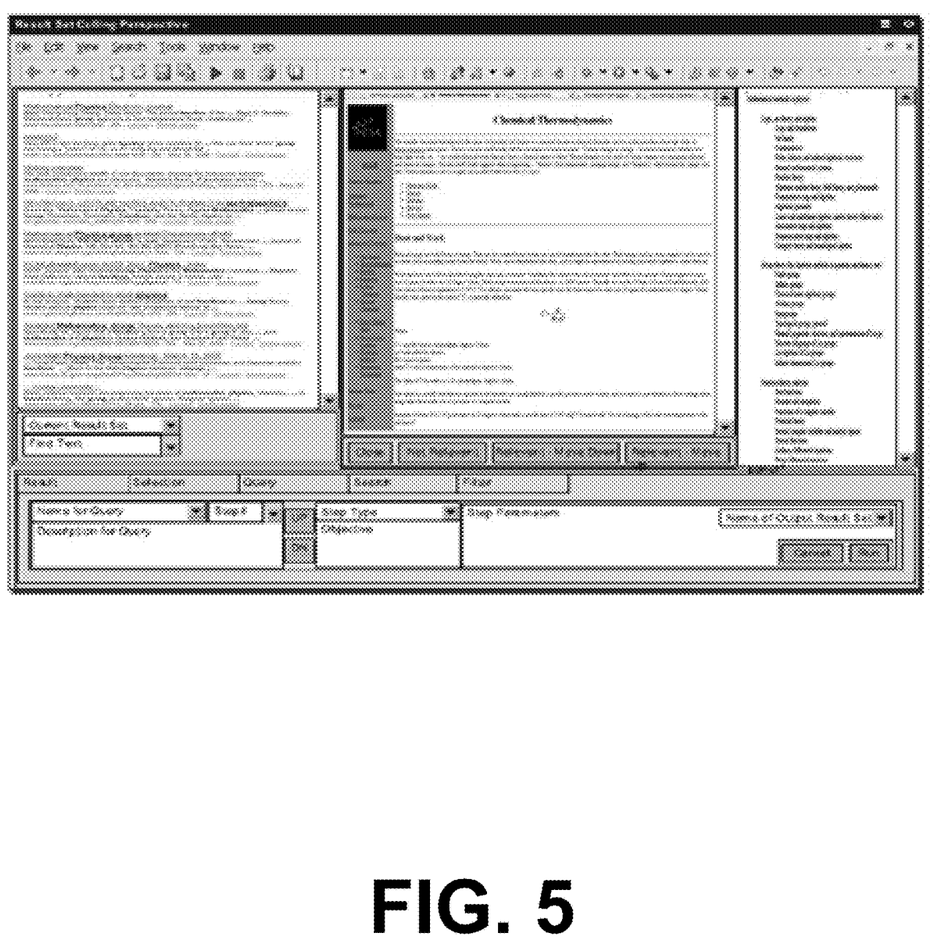
FIG. 5 is a workbench user interface view showing culling views, according to an embodiment of the invention.

The invention is directed to an improved information creativity, collection, categorization, and retrieval lifecycle, a functional architecture (also described hereinafter as a framework), and improved methods for providing network-based creativity, ttx collection, categorization, retrieval, and exploitation. Embodiments of the invention provide general tools for creativity, categorizing, virtual mapping, visualization, search, and retrieval of ttxs and its extensions for web communities and analytics. Embodiments of the invention also provide a specialization of the general tools directed to technology innovation, creativity, and categorizations, as well as the procedures for manipulating categorizations and use of the tools, technical information categorization and retrieval controls, and business processes for incentivization and fee collection.

Sub-headings are used below for organizational convenience, but do not necessarily limit the disclosure of any particular feature to any particular section of this specification. An improved information categorization and retrieval lifecycle including the process flows involved is presented first, followed by the tool descriptions and the related process flows. The Functional Architecture is presented after the lifecycle, tools, and process flows.

Observations: Advantages and Disadvantages

One use of creativity is in technology innovation. One use of creativity is in legal argument, resulting in development of law.

Creativity

There is a need to better organize for and incentivize creativity and innovation. This creativity begins with the general case of 'new idea' to be collected and categorized, but extends to: by way of example, technology innovation and entrepreneurship. The need extends to incentivizing entrepreneurs to start businesses based upon needed technologies and for technical people to be incentivized to work on clearing the roadblocks to use of technologies. There is an additional need to improve the capturing and use of creativity and the reusability of innovation workers' results, and to otherwise use the information collected for more efficient and effective innovation. There is a need to provide continuous quality improvement of ideas and an iterative process that yields a continuous flow of new ideas and improvements for predictions.

There is a need to reuse the efforts of others over time, incorporating and improving other's understanding of relationships among tcepts, their purlieu timeframes or contexts, and their cncpttrrts.

There is a need to foster innovation within society and within companies. This need extends to more effective collective development of innovations. Sharing of innovation globally or within a project or company, coupled with protections and collective development, is needed.

Legal Clarity

There is a need to decrease an inventors time to file for patent protection. The economic benefit of immediately filing has changed dramatically through reduced cost to file and reduced burden on best mode and possibility of non-public inventorship.

There is a need to improve the common understanding of the issues and ttxs as recorded by others in legal documents, research papers, and more generally. People around the world have different opinions on definitions of a ttx, and what categorization it should fall under. The difference increases over time partly due to generalization chauvinism theory—since people judge past eras by present standards.

There is a need to show ttxs and issues side by side other sources regarding similar ttxs, and products offering these classification indices must be improved to become more dynamically organized to improve efficiency. Examples of such systems abound, including the Shepard's system, Lexis and Westlaw, all of the various patent research systems.

Sharing of Creative Results

There is a need to answer the currently existing demand for technology by uncovering the available technologies isolated in the mind of any of the thousands of potential inventors now unable to find the appropriate means to get an idea into the reach of those able to make use of it.

There is a need to improve the current burdensome common ground for inventors, technology seekers, and technology holders called the patent system. Efficiency demands allowing these groups to come together and share their knowledge, their problems and their potential solutions to avoid replication of technology invention and solve the chaos created due to disorganization existing in today's world.

Learning

There is an additional need to empower meaningful learning. "Meaningful learning results when new information is acquired by deliberate effort on the part of the learner to connect the new information with relevant, preexisting topics or propositions in the learner's own cognitive structure." Ausubel. Here, meaningful learning involves the assimilation of new ttxs and propositions into existing cognitive structures.

Information Management Tools

There is a need for improvement in technology information management, a broad field today hobbled by a lack of effective tools and proper incentives.

There is a need for users to decrease their costs for legal research. The present Shepard's system, while widely used, is costly yet restricted in abilities relative to what is possible today with dynamic indexing and refinement, akin to but beyond Google's systems.

Name and Relationship Based Information Management Tools

There is a need to provide deeper classification. What is needed is a tool to mitigate the differentials in understanding levels between experts and novices while addressing the needs of each, and managing the authority and quality issues related to dynamic classification complexity.

There is a need to reduce redundancy and provide authority control in the presence of multiple manifestations—ttxs that are identical in meaning but have different names, names in different languages, misspelled names, or different explanations that are equivalent.

There is a need to name ttx categories in an automated categorization process, such as in clustering, and a need to name ttxs where they are collected automatically as occurs in scraping.

Currency of Technology Description

Currency is the up-to-datedness of information provided from a repository.

Categorization Services

Known categorization services provide slowly changing and superficial categorization indices.

There is a need for greater ease of use of categorization services and tools. Known systems and methods fail to take into account the full lifecycle of creativity, of categorization delivery, or of categorization refinement and reuse, or to coordinate the information needed for process improvement.

Also, known tools aimed at helping Intellectual Property owners manage their own property provide solutions that allow them to categorize their property with that of others, but the categorization structures fail to recognize the complexity of the need. The insufficient tools cannot effectively serve product departments more generally causing both unnecessary infringement and wasteful reinvention. Search and Retrieval There is a need to greatly improve searching of highly categorized ttxs. Failure to provide effective searching leads to superficial searching and unnecessary culling of results. By way of example, the field of Prior Art Searching has limited and costly facilities for accurately finding prior art, and the effect is that the cost of each search is high and that results are poor. This leads inventors to forego searches, to spend large sums on fruitless patent prosecution, to claim excessively on patent applications, etc. Patent offices are hard pressed to maintain performance as well. Lack of good quality searches leads to major costs for all concerned as patents are issued and must then be defended against similar technologies.

There is a need for expansive searching, tying information from disparate sources into the result. Present search engines such as Google provide limited sourcing, including local files, corporate knowledge bases, Google knowledge bases, and internet searches. Even this wide set is limited, failing to provide for searches of fee sources and deep web data.

Even if the forgoing needs are addressed, there is an additional need to present the information in a way that users may be educated, may remember context, and may search associatively (by co-location).

Prediction

The need for currency does not stop at the present. Professionals plan ahead and need to share the information at least internal to their organization. Individuals want to see ttxs before they are real. Inventors want to know what ideas others have disclosed, not just which ones have been realized into a product. This need is the bridging of the abstract and reality.

The need for currency, best availability, and provision of future, the presence of abstract ttxs presents a significant need for collaboration by many users for refinement to decrease the abstraction toward reality. This leads to the need for consensus building to choose the better of multiple user contributions.

Collaboration

There is an additional need to enable effective collaboration. Collaboration in tcept categorization and description already exists widely in the patent system and in research.

There is also a need to manage ownership interests both in the existing and newly contributed information.

Response

Recently however, many new technologies have enabled the solution. A CMM offering a structured 'best available' understanding of an area of knowledge, limited in scope, can now be built to serve as a commonplace. A graphical interface aligned with a query facility can bring efficient and reusable mapping to users. Content will improve if incentives are available to users who focus on incrementally defining new tcepts or new appcepts. Content will improve if an ecosystem for the users of a tcept offers community website structures specific to the tcept.

A database that is the best available source for a list of tcepts and appcepts provides significant value from the accumulated CMM information. Tcepts gain liquidity because a market is created where the tcepts can be licensed and sold. Tcept and appcept data also gains value and can be used, licensed, or sold. The holder/owner of the database can extract value from that accumulated CMM information and the interest information from use. Also, users can be offered access to that value for a fee. An ability to allow users ownership and control of their search results is valuable.

A visualization display showing ttxs that are very similar in close proximity provides at least a visual clue to users that the similarity exists. Collocation (a more precise matching) by self-organizing mapping is useful to essentially combine ttxs by apparent similarity. The CMM is more permanently improved by automated merging and categorization, and a user ability to note that two ttxs are so similar that they really should be considered to be in the same category or that they should be the same by combining them.

Such a commonplace can provide prior art searching, competitive environmental scanning, competitive analysis study repository management and reuse, innovation gap analysis identification, novelty checking, technology prediction, investment area assessment and planning, and product comparison and feature planning.

Early and efficient capture of users' imagination into an accurate structure of the commonplace will empower the most imaginative/expert users in specific areas of technology to efficiently create in the most detailed categories —the fringe areas or the most futuristic ttxs. Early capture maximizes the currency of the categorization. Improving the authority or quality of the information held by proper consensus will ensure the CMM's 'best available' status.

Searching is like playing charades. A search engine as described here attempts to find what a person is trying to describe, from what they can 'verbalize', about the thought they have. When a person tells the search engine what s/he is searching for, s/he is acting in ways meant to convey their 'charade idea'—a concept hidden in their mind. That idea is not necessarily being simply described in words directly into the search engine, but rather through this set of acts such as keyword/phrase searching and document relevance culling, 'survey' question answering, focusing selection display and serendipitous discovery of possible ways to classify the thought, search goal 'avatar' repositioning, technology combination, stating that an application is being solved, stating the traits of the concept, etc., all placed/combined into multiple 'action' or 'step' discussions with the search engine, possibly over a very extended timeframe, and sometimes involving more than one person (sometimes many) into the 'collaborative' search process. Collecting and using all of these combined indicators effectively to 'understand' the concept being searched for is the base technical purpose of the search engine, but the building of the knowledge base from it for later reuse is the key to effectiveness in crowd sourcing.

Additional Purposes, Features, and Advantages

This section presents summaries of some of the system's other purposes and why the system has value in achieving those purposes.

Document Management and File Systems

Today, document management is most often seen in a personal computer where it is typical to have 300,000 files, most of which are hidden. In typical law offices, the number of paper documents and files is much higher. These documents and files must be controlled, categorized, and accessible, yet the control varies between the document tracking the football pool and the document key to a $Billion verdict. Categorization is extremely differentiated because one document may be relevant to many issues. No one wants to wait for the documents to become 'useable'. This system provides cnxpts to categorize information, and allows documents, as information resource info-items, to be 'occurrences' of the cnxpt. The cnxpts may be changed, recategorized, categorized in multiple ways, etc., but the documents stay with cnxpts unless moved, and documents can be 'occurrences' of multiple cnxpts. Workflows can manage documents as information resource info-items, and cnxpts. Alerts and several other paradigms greatly assist the user to find, obtain, categorize, and access the information resources. Goals are useful to add notes and new areas.

News Collection and Publishing

Traditional news consisted of trusted reporters spreading out and digging up facts. The spreading out is costly as is the digging up. Trust is costly as well. This system cannot fully supplant all of the news operation, but it greatly diminishes the costs involved by crowd collection and trust model operation. News collection will naturally become more rapid, and many 'readers' will have the opportunity to obtain news specifically relevant to them faster with fewer intermediaries, with or without 'filtering' by quality of source, amount of editorial review, translation, or print layout. The instant application can form a bridge between "Twitter" and online newspapers, while naturally also building interrelationships between stories; categorizing the stories by issue, time, interest, etc.; and mapping the topics of the stories for more rapid associative searching.

Law

The business of law has the major areas of Law—Precedent; Litigation—Theory of the Case and presentation; and Evidence—Discovery and presentation, among others. These each evolve over time and require detailed categorization of information within them. Each is 'crowd' oriented, where precedent is established by many jurisdictions, litigation always involves at least two theories of a case, and facts must be supported by evidence that must be obtained and analyzed by many participants. As a document or information management problem, each of these areas can be made more efficient with the instant application. The application of evidence to facts involves the detailing of the specific evidence relevant to the fact, or, in terms here, the establishment of 'occurrences' to cnxpts representing facts. The breakdown of law to elements is a categorization of elements to be associated with law, precedent, contract, legal opinion, other elements, or doctrine, often hierarchically. The application of facts to law involves the establishment of associations between facts and elements. Precedent and statutory law is now and can be better categorized over time by issues as well as citation. The repeated searching for pertinent law by a large number of attorneys is an expert level crowd sourcing wisdom of crowds operation already, but it is inefficient and costly. The instant application provides efficiency, where issues are represented by cnxpts, specific opinion text is represented by cnxpts, and court orders, trial documents, statutes, and other documents are represented by information resource info-items. The issue and opinion text cnxpts are associated and categorized by associations between cnxpts by the searching or manual operations as discussed below. The mapping process below provides better searching results. The result sets enable better searching not only for the first user interested in an issue but for all subsequent users. The associative search queries track issue development. The shared queries, paths, and results assist secondary users of many ilks, such as clerks and law students. The cnxpt categorization provides element sub-element structuring, and the reapplication of elements across precedent and theory, with differentiations. The connection of facts to law by association gives refinement tools to an attorney, providing a review mechanism to his supervisors, an assembly mechanism for legal teams, and a structuring tool for writing or analysis. Discovery involves process/workflow management, document management, setting objectives (information sought), document review (classification, analysis, ranking, presentation arrangement), etc. all of which involve information resource info-items, people (and other txo's), and cnxpts, and all of which must be performed in cycles or in refinement. Litigation is the process of setting a strategy to present a theory and then presenting the evidence relevant to it. Litigation, in terms here, is the assembly of the facts in a theory, and the assembly of the evidence relevant to those fact into a presentation. In terms of the instant application, litigation is the establishment of cnxpts representing the theories, elements, and facts, and the setting of relationship strengths on associations and occurrences to show priorities or importance or for otherwise setting presentation order.

Other Advantages

Further objects and advantages of this invention will become apparent from a consideration of the drawings and ensuing descriptions.

What is claimed is:

1. A computer-implemented method to manage the display of information, the information in a form selected from the group of: a taxonomy, a tree data structure, a forest of trees data structure, a categorization, a graph, a directed graph, a precedence diagram, a graphical forest, and a combination of a plurality of the foregoing; the information in a logically correct arrangement according to a paradigm selected from the group of: the subjective opinion of the user, the subjective opinion of the user considering the opinions of others, the objective opinion as formed by a crowd, the consensus opinion of an ensemble of machine learning results, the subjective opinion of the user considering an ensemble of machine learning results, and the subjective opinion of the user considering the opinions of others as well as an ensemble of machine learning results; comprising:
- a. defining a knowledge model comprising the organization of said information, wherein said information includes objects selected from the group of: cnxpts representing concepts, at least one association between cnxpts the association representing a relationship between concepts, and zero or more fxxts based on the information stored regarding the plurality of cnxpts and the at least one association wherein a fxxt meets one condition selected from the group of: no association is marked with a fxxt, no cnxpt is marked with a fxxt, at least one cnxpt is marked with at least one fxxt, and at least one cnxpt participates in one or more associations marked with at least one fxxt;
- b. providing a computer storage to hold said information;
- c. generating, using a map definition referencing the set of zero or more fxxts, a derived ontology for one or more domains of wisdom by extracting references to zero or more associations and zero or more cnxpts into the derived ontology;
- d. generating, using said map definition referencing the set of zero or more fxxts, a skeletal structure for a map instance for said one or more domains of wisdom from the extracted derived ontology wherein the resulting map skeletal structure of said map instance is based upon a manner of analysis selected from the group of: a spanning forest manner, a descendent forest manner, an enhanced descendent forest manner, an ascendant forest manner, an enhanced ascendant forest manner, and a structure comprising a combination thereof;
- e. generating, using said map definition referencing the set of zero or more fxxts, one or more organizations of knowledge to structure a map instance for said one or more domains of wisdom from the extracted derived ontology wherein the resulting map structure of said map instance is based upon a manner of map assembly selected from the group of: a spanning forest manner, a hierarchical manner, an enhanced descendent forest manner, an enhanced ascendant forest manner, a vertical manner, a directed graph manner, a graph manner, a horizontal manner, a depth augmented manner, a time augmented manner, a purlieu augmented manner, and a structure comprising a combination thereof, wherein vertical and horizontal are mere duals for labeling in combinations;

and
- f. providing to the user said one or more domains of wisdom for utilization in a form selected from the group of:
  - i. providing access to the data contained in said one or more organizations of knowledge for one or more domains of wisdom of said map instance for utilization directed at a solution of a problem the user is considering; and
  - ii. displaying a visual derivative of said one or more organizations of knowledge;

whereby the arrangement allows adjustment by the user to bring it into a more esthetically acceptable positioning for the user.

* * * * *